United States Patent [19]

Gonia

[11] Patent Number: 4,486,253
[45] Date of Patent: Dec. 4, 1984

[54] METHOD OF MAKING A MULTICONDUCTOR CABLE ASSEMBLY

[75] Inventor: Richard J. Gonia, New Berlin, Wis.

[73] Assignee: General Electric Company, Schenectady, N.Y.

[21] Appl. No.: 391,907

[22] Filed: Jun. 25, 1982

Related U.S. Application Data

[62] Division of Ser. No. 202,530, Oct. 31, 1980, Pat. No. 4,356,345.

[51] Int. Cl.³ .................... B32B 31/24; H01B 7/08
[52] U.S. Cl. .................................. 156/51; 156/47; 156/305; 174/117 F; 174/117 M; 174/117 R; 427/117; 427/118; 427/207.1; 427/208; 428/294
[58] Field of Search ............... 156/47, 51, 55, 166, 156/180, 305, 308.4; 174/36, 117 F, 117 M, 117 R; 427/117, 118; 428/207.1, 208, 294

[56] References Cited

U.S. PATENT DOCUMENTS

| | | | |
|---|---|---|---|
| 2,204,782 | 6/1940 | Wermine | 156/55 |
| 2,828,234 | 3/1958 | Hengel et al. | 174/117 R X |
| 3,005,739 | 10/1961 | Lang et al. | 174/117 F |
| 3,208,896 | 9/1965 | Lang et al. | 156/47 X |
| 3,312,579 | 4/1967 | Heifetz | 156/305 |
| 3,458,650 | 7/1969 | Miyawaki et al. | 174/117 F |
| 3,536,548 | 10/1970 | Chilcote | 156/51 |
| 3,537,927 | 11/1970 | Anderson et al. | 156/47 |
| 3,984,622 | 10/1976 | Ross | 174/72 A |
| 4,229,615 | 10/1980 | Orr et al. | 174/117 F X |
| 4,276,333 | 6/1981 | Cobean | 428/294 X |

Primary Examiner—Robert A. Dawson
Attorney, Agent, or Firm—Wheeler, House, Fuller & Hohenfeldt

[57] ABSTRACT

A method of making a multiconductor cable assembly is disclosed wherein at least a portion of the cable assembly is comprised of multiple insulation-sheathed conductors arranged side-by-side in contiguous relation so that the insulation sheaths of adjacent conductors have a substantial interfacing contact area. First and second beads of material integral with the adjacent conductor sheaths and located adjacent each side of the interfacing contact area hold the cable together and maintain its flat profile. The cable can also include portions having a compact profile and can have unbonded ends. The cable assembly is formed by applying a bonding agent, comprised of a filler dissolved in a solvent for the insulation sheaths, as a bead between each pair and on each side of contiguous conductor sheaths. The bonding agent beads initially intermingle with the insulating sheaths material, but do not penetrate into the interfacing area between contiguous sheaths. The bonding agent solvent then evaporates, leaving beads of the filler material which are integral with the material of the insulating sheaths.

3 Claims, 6 Drawing Figures

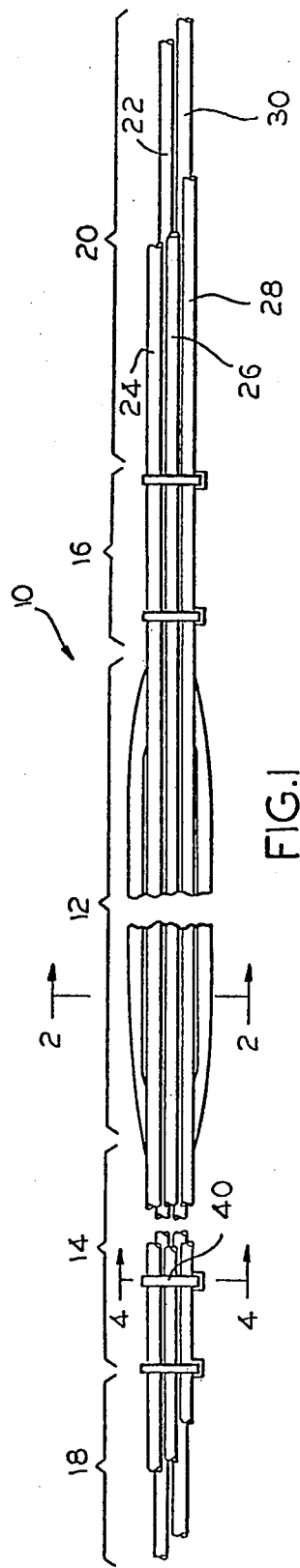
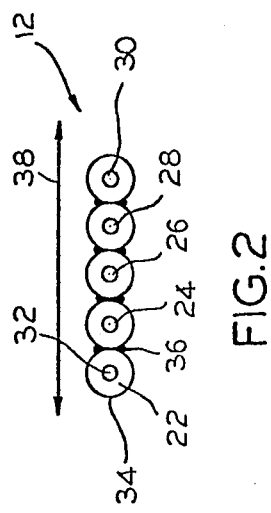
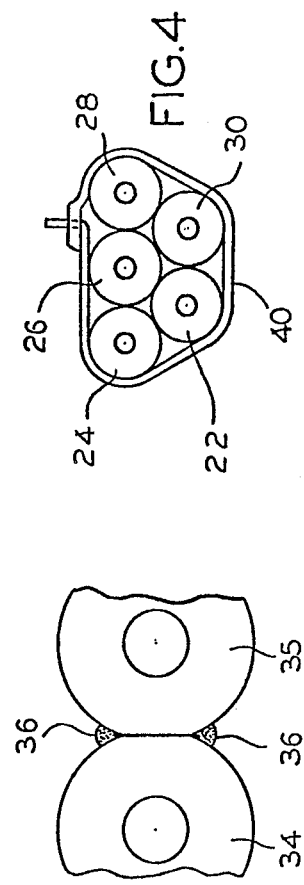
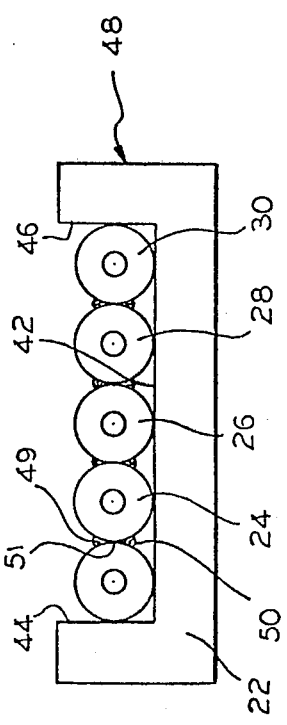
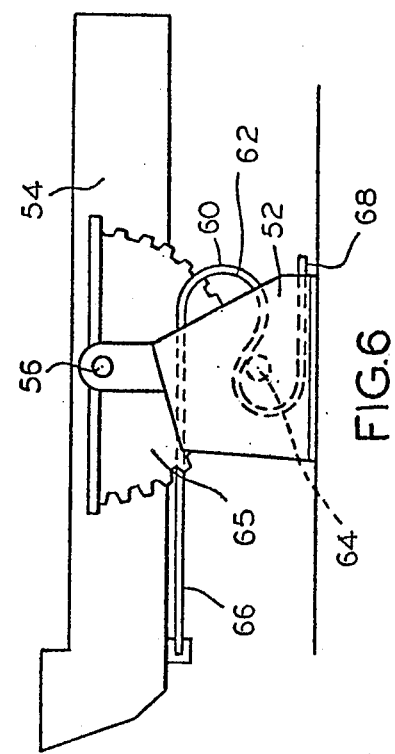

METHOD OF MAKING A MULTICONDUCTOR CABLE ASSEMBLY

This is a division of application Ser. No. 202,530 filed Oct. 31, 1980, now U.S. Pat. No. 4,356,345.

BACKGROUND OF THE INVENTION

The present invention is a multiconductor electrical cable assembly for spanning between stationary and movable machine parts on at least one of which there is an electrical device to which the cable connects. The present invention is furthermore a method of making such multiconductor cables from individual sheathed conductors or smaller cables.

Multiconductor cables which yield readily to bending forces applied in certain transverse directions and which are less flexible or yielding to forces applied orthogonally to those directions are known. A group of coplanar parallel wires joined together with a homogeneous insulating material to form a cable which is wider than it is thick is an example of a cable having these flexing properties. But cable assemblies having the right number or assortment of individual conductors with appropriate insulation or dielectric properties and the proper degrees of flexibility for a particular application often are not available. In such cases the prospective user may be obliged to tie cables together to form a makeshift assembly which does not have the desired flexing characteristics. A method of making and using a suitable cable assembly which differs from prior art practices is disclosed in detail later.

Additionally, the prior art does not suggest a multiconductor cable with a flattened central portion and end portions adjacent the central portion which are equally flexible in all directions to allow the end portions of the cable to be routed in any direction.

Finally, the known methods of joining conductors to form a cable cannot be used to form a flexible multiconductor cable assembly having a flat profile. To form such a cable, three criteria must be met. First, the joints between the conductors of the cable assembly must be able to withstand repeated flexing. Second, the joining method must not damage the sheaths of the individual conductors. Third, the flexibility of the cable must not be impaired by the bonds between the individual conductors. None of the known joining methods satisfy all of these criteria.

In heat bonding or ultrasonic bonding methods of the prior art, electromagnetic or ultrasonic energy applied to juxtaposed conductor sheaths heats adjacent portions of the sheaths to allow them to flow together into an integral structure. Energy cannot be applied to adjacent conductor sheaths to form such a bond without applying some excess energy to parts of the sheaths which do not participate in bonding. Even if the source of energy is focused only on the parts of the sheaths to be bonded, some of the energy will be conducted to adjacent areas. This excess energy can damage those adjacent areas of the sheaths. The presence of this excess energy also makes the extent of bonding difficult to limit. The flexibility of the multiconductor cable assembly is impaired if the extent of bonding is not limited. Thus, the criteria of avoiding sheath damage and maintaining cable flexibility are not met by ultrasonic or heat bonding methods.

In solvent welding methods of the prior art, a solvent for the conductor sheath material dissolves portions of juxtaposed sheaths to allow them to flow together into an integral structure. The solvent then evaporates, leaving a bond which is analogous to heat or ultrasonic bonds. Solvent welding has the same disadvantages as heat or ultrasonic bonding. The solvents typically have a low viscosity, and are thus very mobile and difficult to confine to the parts of the conductors to be fused together. Overbonding (which reduces the desired flexibility of the cable) and damage to the conductor sheaths can result.

In adhesive bonding methods a bonding material, typically having a much higher viscosity than a solvent, is introduced between the juxtaposed conductors. If necessary, the material is cured. This bonding material adheres to each conductor and coheres to itself to bond the conductors together. Adhesive bonding does not join the conductors as securely as other methods, for the bonding material does not penetrate the sheath to become an integral part thereof. The inventor has found that flexible multiconductor cable assemblies which are adhesively bonded will fail prematurely when they are repeatedly flexed in use. Adhesive bonding also stiffens the cable assembly, since the bond material added to the assembly resists flexing. Thus, adhesive bonding does not meet the criteria of withstanding repeated flexing and maintaining cable flexibility.

In mechanical bonding a series of clamps are used to bind the conductors together into a composite structure having a flat profile. This bonding method does not meet the criterion of avoiding damage to the conductor sheaths. Relative movement of the conductors, particularly when the multiconductor cable assembly is flexed, causes the conductor sheaths to chafe against the clamps and permits individual conductors to kink near the sites of clamping. The clamps can also engage other structures to interfere with the motion of a cable assembly which spans between movable and stationary machine parts.

SUMMARY OF THE INVENTION

In the present method, multiconductor cable assemblies are formed from conductors having solvent weldable insulating sheaths. The conductors are clamped in side-by-side contiguous relationship along at least a portion of their mutual lengths to form a first cable portion having a flat profile. The cables are bound together tightly so their abutting portions are flattened together to form a substantial interfacing contact area. Next, two beads of a combination filler and solvent welding agent are applied for joining each insulating sheath to the adjacent sheath in the first cable portion, without allowing substantial bonding in the interfacing area. Then the bonding agent is cured. This procedure forms a portion of the cable length, or alternatively the entire cable, into a generally planar unitary multiconductor assembly which readily yields to bending around transverse axes which are parallel to the plane of the cable, but which does not easily yield to bending around other axes. Because the bonding agent contains a filler, it will bond adjacent conductor sheaths together without penetrating the interfacing contact area between adjacent sheaths, and without requiring that so much bonding agent be used as might excessively dissolve, and thus damage the cable sheaths.

The preferred bonding agent for polyvinyl chloride insulation sheaths is a suspension of polyvinyl chloride in a solvent for polyvinyl chloride.

An improved multiconductor cable assembly is a second aspect of the present invention. A central portion of the multiconductor cable asembly has a flat profile having the bending characteristics described above, while portions of the conductor adjacent the central portion of the cable are bundled into a compact profile which is equally bendable around any axis that is transverse to the length of the cable. The ends of the cable can remain unbonded to avoid damaging the insulation at the ends of the conductors and to allow the ends of the individual conductors to be routed away from the longitudinal line of the cable.

Thus, an improved multiconductor cable can be provided which interfaces electrically between a rotatable machine part and an immobile machine base. The cable is particularly useful for electrically connecting the patient support table of a diagnostic X-ray machine to an immobile base of the machine. The multiconductor cable assembly is illlustrated and described herein in connection with an X-ray table.

BRIEF DESCRIPTION OF DRAWINGS

FIG. 1 is a plan view of an embodiment of the new multiconductor cable.

FIG. 2 shows a transverse section of the cable taken in the plane defined by line 2—2 in FIG. 1.

FIG. 3 is an enlarged fragmentary view of FIG. 2, showing the beads of bonding material which bond adjacent sheaths together.

FIG. 4 is a transverse section taken in the plane defined by line 4—4 in FIG. 1.

FIG. 5 is a transverse section of a flat profiled portion of the cable supported by a jig to maintain the relative position of the individual conductors during a bonding operation.

FIG. 6 is a schematic view of a multiconductor cable of the present invention extending between the stationary base and tiltable patient support of a diagnostic X-ray table.

DESCRIPTION OF A PREFERRED EMBODIMENT

Referring to FIG. 1, the depicted multiconductor cable 10 comprises a central portion 12 having a flat profile (best seen in FIG. 2), intermediate portions 14 and 16 having a compact profile (best seen in FIG. 4), and end portions 18 and 20 in which the individual insulated conductors are not secured together.

Referring now to FIG. 2, the flat profiled portion 12 of cable 10 comprises individual insulated conductors 22, 24, 26, 28 and 30 arranged in side-by-side contiguous relationship, meaning that the centers of the respective conductors, when viewed in transverse cross section, lie along a single line. Each individual conductor comprises a conductive core 32 (which can be comprised of one wire or a bundle of individual sheathed wires) and an insulating sheath 34 to isolate core 32 from the environment.

Referring now to FIG. 3, each individual conductor sheath such as 34 is attached to the adjacent conductor sheath such as 35 by two independent bonds, such as bonds 36, which each consist of a filling material intermingled with material from the adjacent insulating sheaths. FIG. 3 also illustrates how the sides of the sheaths are flattened where they meet so that the groove between them is shallow and only a minimal amount of bonding material need be present to secure the individual sheathed conductors into a bonded multiconductor cable. The interfacing contact area between adjacent conductor sheaths such as 34 and 35 is unbonded to reduce the rigidity of the cable.

The flat profiled central portion 12 of the cable as shown in FIG. 2 is easily bent about axes such as 38 which are transverse to the longitudinal axis of the cable and parallel to a plane defined by the flat profile of central cable portion 12. On the other hand, the flat portion of the cable does not easily yield to bending about axes perpendicular to transverse axis 38.

FIG. 4 shows the configuration of intermediate segments 14 and 16 of the multiconductor cable of FIG. 1, wherein the individual insulated conductors 22, 24, 26, 28 and 30 are bound into a compact profile. As used herein, the term "compact profile" indicates a transverse cross sectional shape as shown in FIG. 4, in which the sheath of each conductor, for example conductor 28, is contiguous with the sheaths of at least two other conductors such as 26 and 30. In contrast, a cable portion having a flat profile (FIG. 2) has some conductors, such as 22 and 30, which touch only one other conductor, and all the conductors lie substantially in one plane. In the optimum compact profile, the individual conductors are bundled into a formation which, in transverse cross section, approximates a circular exterior profile. Of course, the profile will not be substantially circular until many conductors are assembled into a compact profile.

In a preferred embodiment of the invention the portions 14 and 16 of the cable are maintained in a compact profile by longitudinally spaced cable ties or clamps such as 40. Alternatively, the respective sheathed conductors may be bundled together into a compact configuration using other means. For one example, portions 14 and 16 can be enclosed within a sleeve. For another example they can be adhesively secured. Longitudinally spaced clamps 40 are preferred because they are easy to apply and they suffice to bind these immobile cable portions together.

In end portions 18 and 20 of the multiconductor cable assembly shown in FIG. 1 the individual conductors 22, 24, 26, 28 and 30 are not bound together so that they can be routed away from the longitudinal line of the cable to be connected to suitable connector means. As FIG. 1 illustrates, the individual conductors do not need to be of the same length. Individual conductors of different lengths can be easily connected to a series of longitudinally spaced connection points.

The method of forming the multiconductor cable will now be described. First, conductors 22, 24, 26, 28 and 30, each having a solvent weldable insulating sheath, are arranged in side-by-side contiguous relationship along at least a portion of their mutual lengths to form a first cable portion 12 having a flat profile. This is shown in FIG. 5, in which the five conductors of cable 10 are confined by the floor 42 and sidewalls 44 and 46 of jig 48. Jig 48 is shown in highly schematic form. Jig 48 can easily be modified to allow sidewalls 44 and 46 to be urged toward or away from each other in order to accommodate a varying number of conductors, and to allow the conductors to be clamped in contiguous relationship. Also, means can be easily provided in jig 48 to bear against the individual conductors to maintain their alignment against floor 42.

Next, the individual conductors held in jig 48 are bonded together using a bonding agent which has filling and solvent welding properties.

The bonding agent is applied to the conductor in jig 48 as a series of longitudinal beads such as 49 and 50 which bridge between the sheaths of adjacent conductors such as 22 and 24. The beads of the bonding agent are positioned adjacent, but just outside, the interfacing contact area 51 where the adjacent sheathed conductor such as 22 and 24 touch.

Beads such as 50 in FIG. 5 cannot be directly applied when the cable is in jig 48 because the site of application is confined between the cable assembly and the jig. To avoid this problem beads are applied to the exposed face of the cable, these beads are cured, and the cable is inverted in jig 48. The remaining beads of the bonding agent are then applied to the newly-exposed face of the cable and cured to complete the flat-profiled portion of the multiconductor cable assembly.

The solvent constituent of the beads of bonding agent intermingles the portions of the conductor sheaths touched by the bead with the filler constituent of the bead. The solvent evaporates when the bonding agent is cured, and the resulting bead is integral with the material of the conductor sheaths. But the bonding agent does not substantially penetrate the interfacing contact areas such as 51 of the multiconductor cable assembly, so the portions of the conductor sheaths adjacent the interfacing contact areas remain unbonded.

The bonding agent used to practice the present method invention is a suspension or solution of a polymeric filler material in a mutual solvent for the filler material and the material of the insulating sheaths of the individual conductors. One commonly preferred material for insulating sheaths is polyvinyl chloride. For such sheaths the preferred filler for the bonding agent is polyvinyl chloride, and the preferred solvents are chlorinated ethylene solvents such as trichloroethylene and tetrachloroethylene. A highly preferred bonding agent for use herein is a suspension of polyvinyl chloride in a chlorinated ethylene solvent. Such a bonding agent is known generically as liquid vinyl, and has previously been used to refinish damaged vinyl surfaces, rather than as a bonding agent. Liquid vinyl is sold commercially under the trade name "Vyna-Kote" by Spectra-Strip Corporation, Garden Grove, Calif.

The unbound and compactly bound portions of the multiconductor cable assembly are formed in ways which are well known to persons of ordinary skill in the art.

UTILITY OF THE MULTICONDUCTOR CABLE

The structures and methods provided herein are easily adapted to a wide variety of uses, for example, to form a multiconductor cable assembly of the type which provides an electrical interface between a fixed base and electrical devices on the rocking patient table support of a diagnostic medical X-ray machine. The base and patient table support of such an X-ray machine is illustrated in highly schematic form in FIG. 6.

In FIG. 6, a radiographic/fluorographic X-ray machine patient table support 54 is shown which rotates about pivot 56 with respect to a base 52. Patient table support 54 carries a slidable patient table (not shown) and allows translation of the patient table to the right or left in FIG. 6.

A preferred cable placement is illustrated by multiconductor cable assembly 60 in FIG. 6. The mobile central portion 62 of cable 60 has the flat profile shown in FIG. 2, and is transversely bent into a reversed "S" which lies substantially in a single plane parallel to the plane of the drawing. Central portion 62 of the cable is supported by a roller 64 pivotally attached to a cradle 65 which is fixed to table support 54. Immobile intermediate portions 66 and 68 of multiconductor cable assembly 60 are physically connected to the table support and base of the patient table assembly. The unsecured individual conductors at either end of the cable are recessed within the machine and thus are not shown in FIG. 6.

Immobile intermediate portions 66 and 68 of cable 60 each have compact, generally rounded profiles which are equally easy to bend around any transverse axis. The central portion 62 of multiconductor cable assembly 60 is well adapted to be flexed around axes perpendicular to the plane of FIG. 6, thus permitting it to follow the pivotal rotation of patient table support 54 with respect to the fixed base 52 of the patient table assembly. At the same time the flexible central portion 62 of cable 60 is not easily displaced out of the plane of the paper in FIG. 6, so the multiconductor cable assembly is maintained substantially in a single plane. The multiconductor cable assembly in FIG. 6 is thus permitted to flex to accommodate the motion of the machine parts to which its respective ends are connected without allowing it undue freedom to move in unwanted directions. Its motion is therefore predictable.

I claim:

1. A method to form a multiconductor cable comprising the steps of:
   a. providing multiple conductors, each having a solvent-weldable insulating sheath, in side-by-side contiguous relationship along at least a portion of their mutual lengths to form a flat profiled first cable portion having substantial interfacing contact areas between adjacent sheaths;
   b. applying longitudinally disposed beads of a combination filler and solvent welding bonding agent to the sheaths of said first cable portion adjacent each side of each said interfacing contact area; and
   c. curing said bonding agent; whereby to form a multiconductor cable having substantially unbonded interfacing contact areas.

2. The method of claim 1, wherein said bonding agent is comprised of a suspension of polyvinyl chloride in a mutual solvent for polyvinyl chloride and the material of said insulating sheath.

3. The method of claim 2, wherein said conductor sheaths are made of polyvinyl chloride, and said solvent is selected from trichloroethylene and tetrachloroethylene.

* * * * *